United States Patent [19]
Horvath

[11] 3,963,335
[45] June 15, 1976

[54] MAGNETIC TAPE CARRIER

[76] Inventor: Emory Horvath, 7065 Overbrook Drive, Longmont, Colo. 80501

[22] Filed: June 5, 1975

[21] Appl. No.: 584,178

[52] U.S. Cl. ................................. 353/15; 352/25; 352/31; 352/102
[51] Int. Cl.² .................................. G03B 31/00
[58] Field of Search ............... 352/25, 31, 72, 102, 352/103; 353/15

[56] References Cited
UNITED STATES PATENTS

| | | | |
|---|---|---|---|
| 2,822,725 | 2/1958 | Recht | 352/31 |
| 3,556,654 | 1/1971 | Stapleton | 353/15 |
| 3,844,643 | 10/1974 | Aoki | 352/31 |

*Primary Examiner*—Monroe H. Hayes
*Attorney, Agent, or Firm*—Schroeder Siegfried Ryan & Vidas

[57] ABSTRACT

An audio visual reproduction apparatus utilizing an improved tape and film cartridge which is completely enclosed to be tamper-proof and to be used by inexperienced personnel. The cartridge includes transparent apertures therein for projecting light therethrough to view slide films on an endless disc within the cartridge. A dual track magnetic tape on an endless spool provides audio messages corresponding to the slides to be viewed and control signals for switching the slides to correspond with messages. The reproduction apparatus includes a single drive unit which drives the endless tape and film disc through a slip friction type drive. A cooperating brake insures that the film will be held stationary as the message is being played and allows for change in film through the tape drive upon the presence of a control signal to indicate requirement for switching. The tape, drive and brake are accessable through an aperture in the case covered by a removable shutter.

21 Claims, 12 Drawing Figures

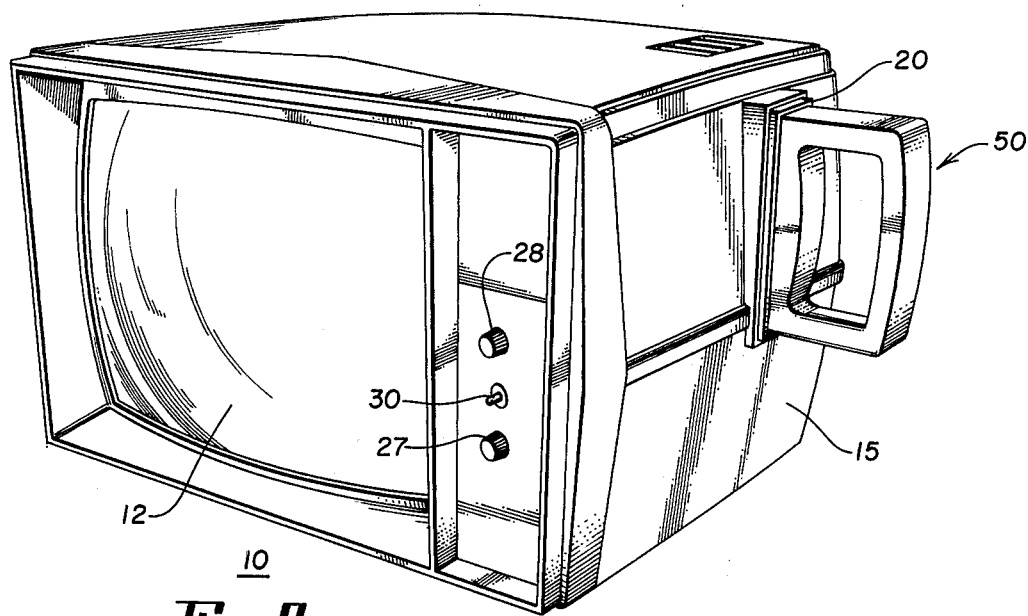
Fig.1
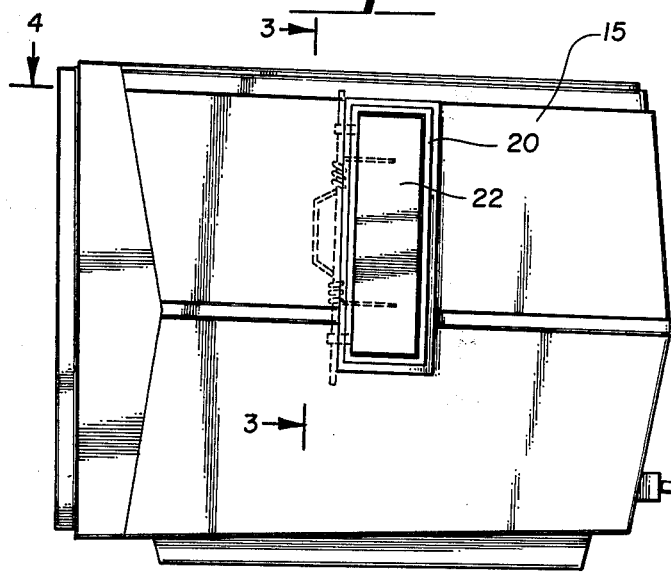
Fig.2
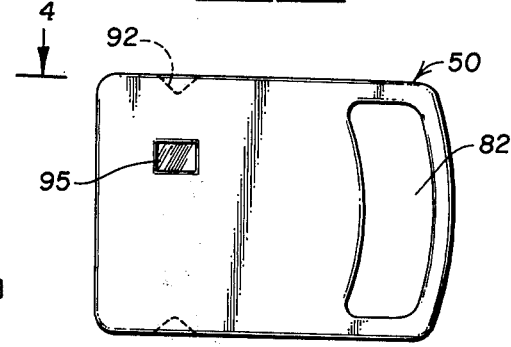
Fig.5
Fig.3
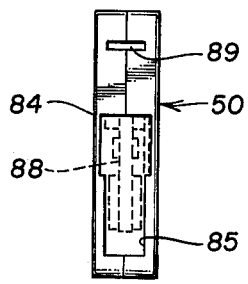
Fig.6
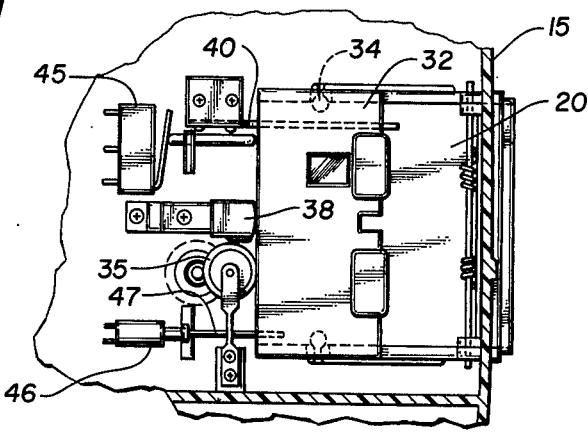

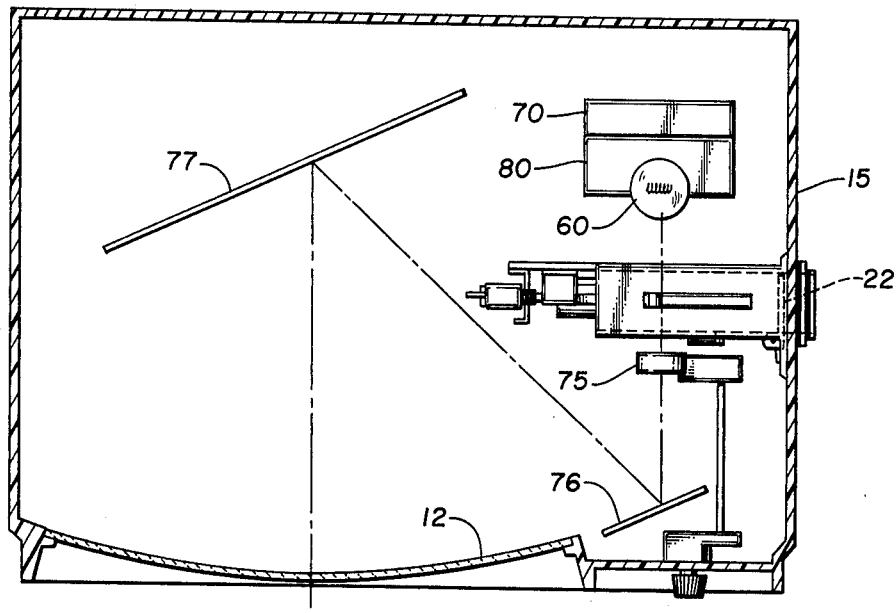
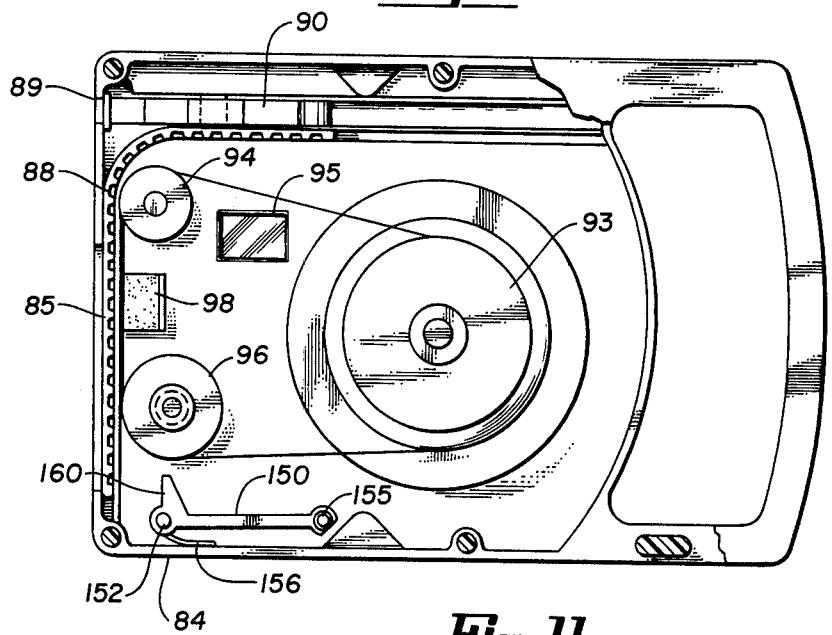
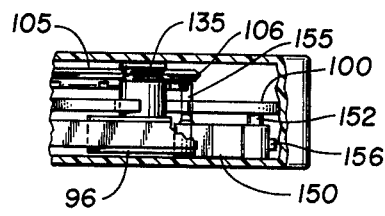

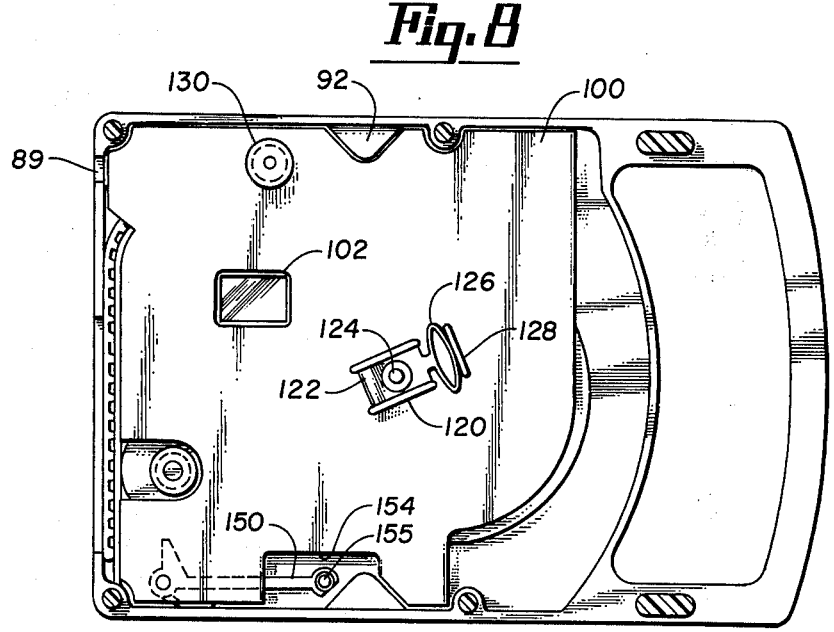
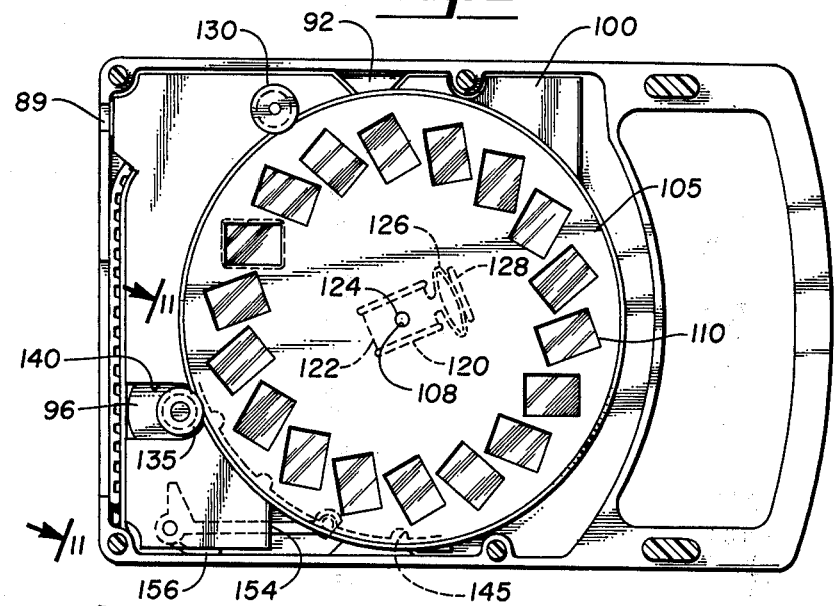
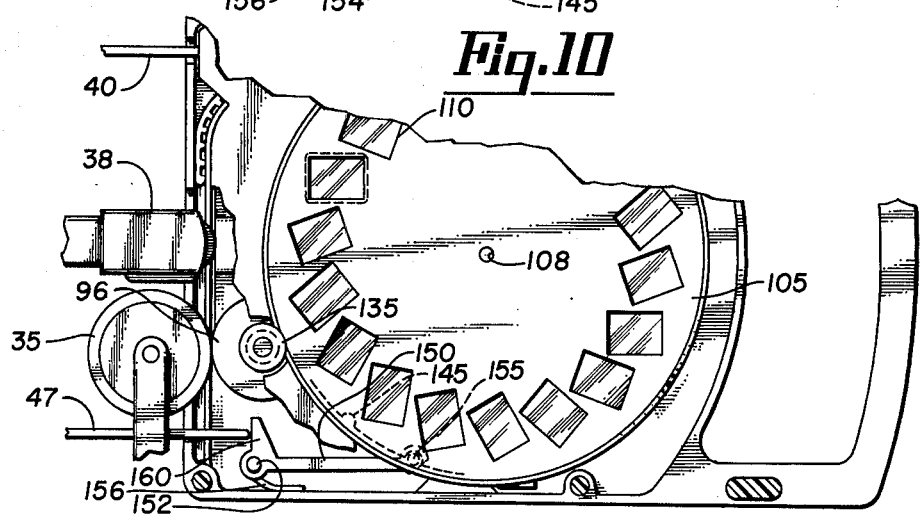

MAGNETIC TAPE CARRIER

My invention relates to audio visual reproduction apparatus and more particularly to an improved magnetic tape and film slide projector and sound reproducer utilizing an improved enclosed tape and film cartridge which is particularly adapted for the use in education and entertainment by untrained, unskilled persons such as for use in children's toys.

Magnetic tape player systems utilizing insertable film cartridges are broadly old. Similarly, the use of a magnetic tape and a film cartridge in a projector and sound reproducer is also recognized as old. In my prior patent application on Magnetic Tape Player System, Ser. No. 474,778, filed June 10, 1974, I have disclosed an improved magnetic tape cartridge which is enclosed and is opened upon insertion into the player apparatus to protect the tape therein. In the present invention, a similar magnetic tape cartridge is utilized to enclose not only the magnetic tape but also a film disc with a suitable shuttered aperture at one end of the same which is opened upon insertion into a audio visual reproduction apparatus to bring the pickup heads into contact with the magnetic tape and to drive the same from the drive roller included in the reproduction apparatus. The same drive roller through an improved drive will rotate the film disc. The latter will be viewed by projecting light from an optical system through portions of the casing and onto the film within the cartridge to focus the same onto a projection screen in the reproduction apparatus. The improved audio visual reproduction apparatus utilizes the improved film and cartridge which is enclosed but has transparent sections thereon for projecting light therethrough and on to film within the cartridge. The film is mounted in a film disc which is driven with the magnetic tape drive and is sequenced to correspond with the information on the magnetic tape so that the visual reproduction will be synchronized with the message on the tapes. Thus, the drive is sequenced to correspond with the control signals included on the magnetic tape so that the visual reproduction will be synchronized with the message thereon. Further, the drive includes an improved brake system which holds the film disc braked for viewing during periods of time when sound reproduction is taken from the tape and indexed to the next film slide during periods when there is no message on the tape. The improved film cartridge includes a two track tape, one track having control signals thereon and the reproduction apparatus includes a dual pickup head, one head being directed to the sound reproduction system and the other associated with the control system which responds to the control tones thereon to operate an actuator and release the brake mechanism within the film cartridge permitting change of the film disc. The film disc may be sequenced manually independent of the control signals to assure proper location of the film with the messages of the film cartridge, and the reproduction apparatus includes means for opening the shutter as the film and tape cartridge is inserted into the same.

Therefore, it is the object of this invention to provide an improved magnetic tape and film cartridge of the enclosed type.

Another object of this invention is to provide an improved tape and film cartridge which is tamperproof, but permits viewing or projection of light therethrough and which is readily insertable into a reproduction apparatus.

A further object of this invention is to provide an improved audio visual reproduction apparatus including an enclosed tape and film cartridge in which the tape and film are driven by a single drive roller.

Another object of this invention is to provide an improved audio visual reproduction apparatus which is readily used by untrained personnel, such as children, and is particularly adapted for use as a toy.

A further object of this invention is to provide in an improved audio visual reproduction apparatus a reset circuit for synchronizing the film slides with the signals on the magnetic tape.

A still further object of this invention is to provide a simplified magnetic tape and film cartridge which is easy to use, relatively tamper proof and unbreakable, and which may be readily inserted into a slot into a reproduction or player apparatus.

It is also an object of this invention to provide an improved audio visual apparatus utilizing the improved film cartridge in which the control components permits starting and stopping of the apparatus by the insertion of the film cartridge therein and which prevents exposure of the components of the same such that the apparatus may be used by untrained personnel such as children.

These and other objects of this invention will become apparent from a reading of the attached description together with the drawings wherein:

FIG. 1 shows a perspective view of a typical audio visual reproduction apparatus with a tape and film cartridge positioned therein;

FIG. 2 shows a side elevation view of the typical audio visual reproduction apparatus with the tape and film cartridge removed;

FIG. 3 is a sectional view of the apparatus of FIG. 2 taken along the lines 3—3 therein;

FIG. 4 is a sectional of the apparatus of FIG. 2 taken along the lines 4—4 therein with parts broken away;

FIG. 5 is a plan view of the magnetic tape and film cartridge;

FIG. 6 is an end view of the same showing the shutter for closing the cartridge;

FIG. 7 is a plan view of the cartridge of FIG. 5 with one case part broken away and parts removed;

FIG. 8 is a plan view of the cartridge similar to FIG. 7 with parts added;

FIG. 9 is a plan view of the cartridge of FIG. 7 with all of the parts therein in a place;

FIG. 10 is a plan view of the cartridge similar to FIG. 9 showing the tape, film disc, and braking mechanism therein in cooperative relationship with the reproduction apparatus when the cartridge shutter is open;

FIG. 11 is a sectional view of the portion of the cartridge of FIG. 9 taken along the lines 11—11 therein; and, FIG. 12 is a schematic circuit diagram for the audio visual reproduction apparatus.

Figure 12:
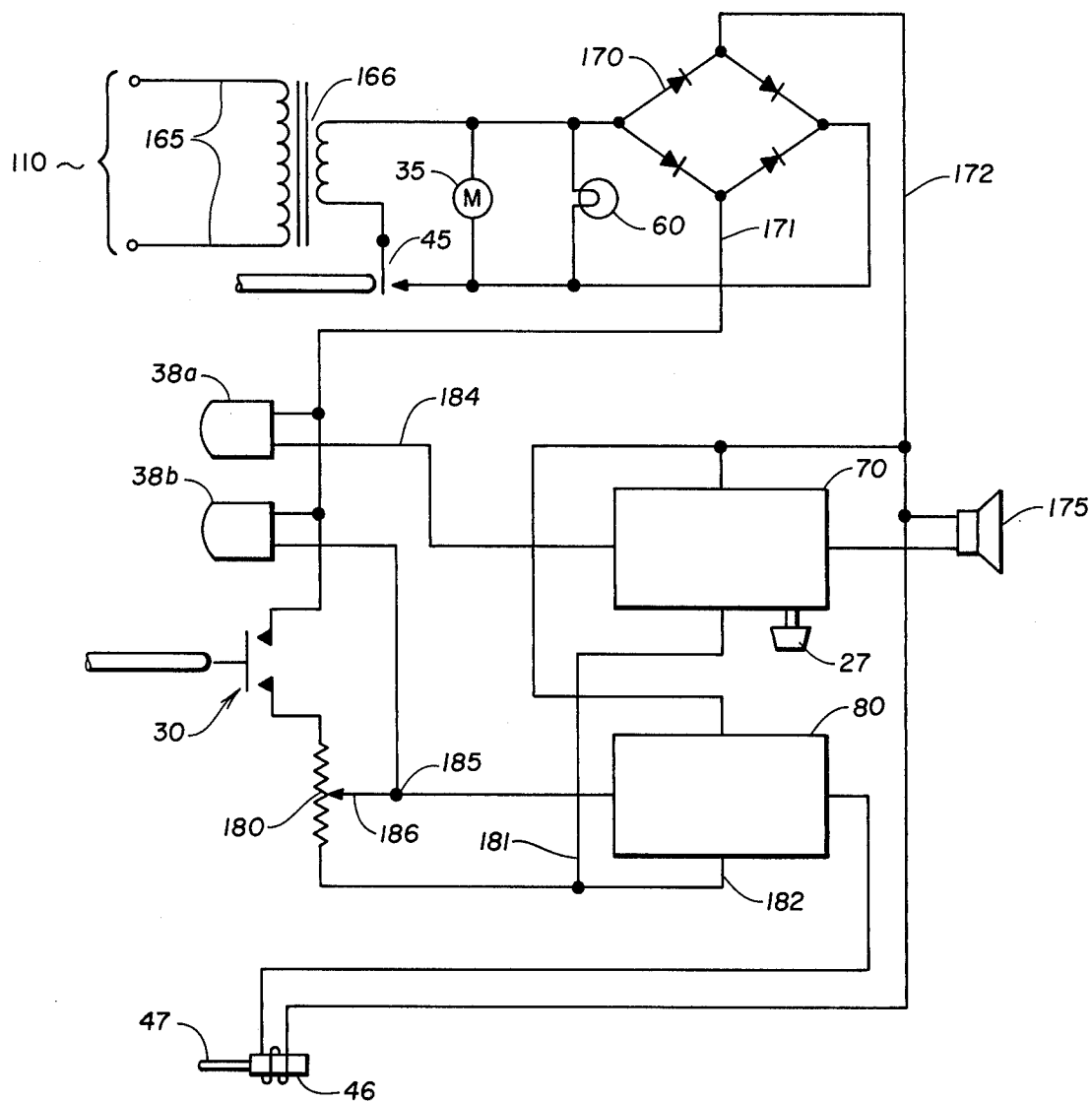

My improved visual reproduction apparatus is shown in perspective in FIG. 1, generally at 10 with a tape and film cartridge 50 inserted therein. The reproduction apparatus includes a screen 12 on the face of the same upon which reproductions of the film pictures will be focused for viewing purposes. The apparatus includes a generally rectangular enclosure 15 having a slot 20 which, as will be indicated in FIG. 2, has a spring closed door 22 covering the same when not in use. A suitable power cord 25 is connected to the enclosure to enable the apparatus to be energized from a conventional AC power outlet. On the face of the box-like enclosure 15 is positioned a volume control or knob 27, a focusing knob 28 and a reset button 30. Control apparatus to be hereinafter identified within the enclosure, includes a switch for turning the apparatus 10 on and projecting the film picture on to the screen 12 whenever a cartridge is completely inserted into the slot 20.

The sectional views of the apparatus of FIS. 3 and 4 show the slot 20 as defined by a channel shaped recess structure 32 with suitable roller gripping means 34 positioned on the side of the same to hold the cartridge in place when it is inserted. The end of the slot structure 32 is open and exposed to a drive roller 35, a dual channel pickup head 38, and a projecting pin 40 mounted on the frame of the recess structure 32 and projecting inwardly into the same to engage the film cartridge as will be hereinafter noted. Also included within the enclosure 15 and suitably mounted within the apparatus is a switch structure 45 and an actuator 46 having a pin 47 projecting therefrom. As will be hereinafter noted, all of these structures engage the film cartridge in one manner or another as the same is inserted into the slot. Within the enclosure is a light source 60, a suitable audio amplifier and speaker indicated generally at 70, a focusing lens 75 and a pair of mirrors 76, 77, which direct the projected image from the cartridge into the screen 12. Also included within the enclosure is a control apparatus or network, indicated at 80, receiving signals from the pickup head, as will be hereinafter noted, and controlling the operation of the actuator 46.

The tape and film cartridge 50 will be best seen in FIGS. 5 and 6 as it is normally used in connection with the audio visual reproduction apparatus. It includes a grip section 82 positioned at one end of the same for handling and inserting the cartridge into the reproduction apparatus. The structure is formed of a casing 84 having a pair of molded sides with one end of the casing having an aperture 85 in the end of the same in which is positioned a flexible and movable shutter 88. This end of the cartridge also includes a small aperture 89 through which the projecting pin 40 is inserted to open the cartridge by moving the shutter 88 away from the opening 85 exposing the interior of the cartridge for playing purposes, as will be hereinafter noted. FIG. 7 shows the lower half of the cartridge which houses the magnetic tape system. This portion of the disclosure together with the details of the movable shutter member and its actuator mechanism is the subject of my co-pending application Ser. No. 474.778 filed June 10, 1974, on a Magnetic Tape Player System. Hence, the details of the endless tape construction, the details of the shutter mechanism and its operating slide structure, indicated at 90, will be omitted herein for simplicity. The casing 84 includes the indentations 92 in the sides thereof for the purpose of cooperating with the locking roller mechanism 24 in the slot to frictionally retain the cartridge in the slot after insertion so as to prevent accidental discharge or release of the same. The casing sides include, in addition, aperture sections 95 with a suitable plastic or transparent material sealed therein to provide for viewing apertures through the casing. The endless magnetic tape is mounted on a spool 93 which is journaled on a suitable post or journaling structure attached to one of the casing halves and suitable guide roller 94 and a drive capstan 96 mounted on this casing part are positioned adjacent the aperture 85 at the end of the casing to position a loop of the tape adjacent thereto for playing purposes. A suitable backup mechanism 98 is mounted on the casing half behind the tape to cooperate with the pickup head in the playing of the tape. The actuating mechanism 90 in the casing and attached to the shutter 88 is adapted to be engaged by the prong or actuating pin 40 affixed to the enclosure and inserted through the aperture 89 at the end of the cartridge casing to open the shutter 88 and expose the aperture 85 and the tape behind the same for playing purposes as the cartridge is inserted in the slot in the reproduction apparatus. Positioned within the cartridge and attached to one of the casing halves enclosing the magnetic tape system is a plate 100, the plate having an aperture 102 therein and serving as a mounting in the film disc 105 of the tape and film cartridge. The film disc has an annular knife-shaped drive rim 106 with a journaling hub 108 in the center thereof and apertures 110 distributed around the periphery of the disc, each aperture mounting a slide film therein. These are equally spaced along the periphery of the film disc and are positioned at an angle to the radius of the disc to bring the rectangular apertures into alignment with the transparent sections 95 in the casing halves and the aperture 102 in the plate which are aligned in assembled relationship so that light may be directed through the same and through the film to project the image thereon to the optical system of the projector to be exposed on the screen 12 of the apparatus. The plate 100 is preferably secured by screws not shown to the casing half mounting the endless magnetic tape system together with the guide roller and drive capstan. Positioned on the upper surface of the plate 100 are a pair of parallel spaced guide members 120 which mount a plate 122 therebetween, the plate carrying a mounting post or journaling shaft 124 for the film disc which fits through the hub 108 therein. One end of the plate carries an elliptical spring mechanism 126 which bears against the fixed stop 128 formed integral or suitably attached to the plate 100 so that the plate and hence, the post will float and is movable under a spring bias pressure for purposes to be later noted. Positioned on the plate 100 is a guide roller 130 which is journaled thereon and which has an annular notched surface to receive the rim edge 106 of the disc 105. Similarly, the capstan 96 has a reduced diameter drive roller section 135 formed integral therewith having a similar V-shaped annular groove adapted to receive the rim edge 106 of the disc 105 and rotate the same. The drive roller section 135 is formed integral with the capstan 96 as an extension of the same and it projects through a notched surface 140 in the plate to engage the edge of the disc. Thus, rotation of the capstan moving the endless tape of the magnetic tape system will provide rotation of the drive roller section 135 engaging the edge of the disc 105 to rotate the same on its shaft 124, the shaft being slidably displaced with the plate 122 under the influence of the spring bias to provide a friction type drive connection. The under surface of the film disc 105 has a plurality of notches 145 positioned around the peripheral edge of the same, each notch being aligned with or corresponding to one of the apertures 110 in the disc. A pawl member 150 having a cylindrical mounting portion 152 at one end of the same is mounted on a post or shaft 153 positioned on the under surface of the plate 100 and projecting into the area adjacent the magnetic tape system. The pawl mounting arm has a pin 155 at the opposite end of the same which pin projects upwardly through a notched or recessed portion 154 of the plate 100 to fit into the various notches 145 on the under surface of the disc 105. The pawl with the pin thereon and the notches 145 in the disc form a braking system to restrain movement of the disc except under conditions when the pawl is pivoted on its mounting post 153 so that the pin 155 is removed from one of the notches in the under surface of the disc. A spring 155 is formed integral with the hub portion of the pawl 150 and bears against the side of the casing of the cartridge to bias the pawl 150 and hence the pin into engagement with the notch 145. Also projecting transversely out from the cylindrical mounting hub 152 of the pawl is a flange member 160 which is located on the under surface of the plate 100 adjacent the endless tape and in line with the aperture 85 in the end of the cartridge casing. The pin 47 of the actuator 46 in the enclosure extends into the cartridge casing and selectively engage the flange 160 to pivot the pawl member 150 and release the disc 105 to rotate through the frictional drive of the capstan under conditions where the mounting disc is to be rotated. Under such circumstances, the actuator will move the pawl against the bias of the spring 155 sufficient to clear the pin from the notch 145 on the under surface of the disc 105. Thus, the friction drive for the film disc 105 includes a brake system in which the brake is periodically released whenever it is desired to rotate the disc to a new film frame. The actuator response is a short period movement sufficient to clear the pin 155 of the pawl from a notch 145 releasing the disc so that the pin rides on the periphry of the disc until the next notch is reached at which point the pin 155 will drop into the next notch and continue the braking action. The frictional drive includes the bias of the shaft 124 and hence the disc 105 toward and away from the drive roller portion 135 of the capstan with a spring bias insuring that a uniform frictional drive will be obtained whenever it is desired to rotate the disc, but sufficient to provide sliding motion of the disc 105 on the roller portion 135 of the drive capstan whenever the brake is applied.

FIG. 11 shows the edge of the disc with an aperture and film therein, the grooved or V-shaped surface of the disc together with the drive roller portion of the capstan and the pawl 50 engaging the under surface of the same to apply the brake.

FIG. 12 shows a schematic circuit for the audio visual reproduction apparatus including the power supply and the components contained in the reproduction apparatus. Schematic circuit diagram of FIG. 11 shows the alternating current input portion 165 which could be connected through cord 25 to conventional household outlets such as 110 volts, 60 cycle AC power through the power cord 25. A step-down transformer is included in the control circuit with a secondary winding 166 being connected through the on-off start switch 45 to the drive motor 35 for the reproduction apparatus, the lamp 60 for the reproduction apparatus and the full wave rectifier indicated at 170 and providing DC power for the remainder portion of the circuit. Thus, whenever the switch 145 is closed by insertion of the cartridge into the slot of the apparatus, power is applied to the motor to provide a continuous operation of the same together with the illumination of the lamp and the energization with the full wave rectifier. The DC or secondary side of the rectifier as indicated by the conductors 171, 172, feeds the control circuit which includes the pickup head 38 which in fact is a two channel unit, the sound reproduction amplifier 70 powering the speaker 175 and the control circuit 80 operating or energizing the brake actuator 46 to operate or move the pin 47 thereof. Thus, conductor 171 is connected through to one side of each portion of the pickup head 39 A,B in parallel with the circuit being continued through a reset switch 30 operated by the reset button on the face of the tube to an adjustable voltage resistor 180 to one side of the audio amplifier 70, shown in block form, and one side of the control network 80, shown in block form through conductors 181, 182. The control circuit is completed through opposite polarity terminals of the control network and amplifier connected in common and to the opposite side of the rectifier through conductor 172. A pickup head 38A or the sound channel has a conductor 184 leading to the input side of the amplifier 70. Similarly, the control side of the pickup head 38B has a control conductor 185 leading to the input side of the control network 80 shown in block form. A shunting circuit operated by the reset switch 30 is provided by a voltage tap, indicated by conductor 186, from resistor 180, is also connected to the input side of the control network to bypass or supply a signal to the control network independent of the output of the pickup head 38B. The speaker 175 is energized from the output of the amplifier 70 and from the conductor 172. Similarly, the actuator 46 is energized through a conductor leading to output side of the network and a conductor leading to the conductor 172.

Thus, in the operation of the improved audio visual reproduction apparatus, the insertion of the tape and film cartridge into the slot of the apparatus or enclosure first contacts the pin 40 within the seat directing the same through the aperture 89 and into the actuating portion 90 of the slide shutter opening the slide shutter 88 to open the recess 85 in one end of the film cartridge. As the cartridge is brought into proximity with the end of the slot, it engages the switch 45 closing the power circuit from the alternating current source to energize the drive motor 35 associated with the drive capstan 96. Simultaneously, the light 60 is illuminated and the DC power circuit is energized through the energization of the rectifier 170. The tape and film cartridge will be held in the slot in the friction type gripping action through the movement of the spring biased rollers 34 into the notches 92 in the sides of the cartridge frictionally gripping the same.

With the energization of the DC control circuit, the player amplifier 70 is energized, as is the head 38A, and magnetic signals on the magnetic tape as it moves past the head will be reproduced by the amplifier to audio transmission at the speaker 175. The rotation of the drive roller clamps the loop of endless magnetic tape from the spool between the drive roller and the capstan driving the same past the pickup head 38A. The magnetic tape has a dual message thereon, one half of the same associated with the head 38A being audio transmission associated with the film slides being viewed. The opposite half of the tape being read by the other half of the pickup head 38B is control signals and at the presence of a tone or signal burst, the output of the head 38B will energize the control network 80 to energize the actuator 46 directing movement of the pin 47 toward the brake pawl to pivot the brake pawl out of contact with the film disc. Since the details of the player amplifier and the control network may take varying forms, they are shown in block form for simplicity. Light from the lamp 60 will be directed through the transparent portions of the casing which are located within the confines of the loop of magnetic tape directed around the guide roller and capstan 96 to provide for an overall compact structure. The light will be directed through the film slide and onto a focusing lens 190 which focusing lens is connected to and adjusted by the focusing knob 28 on the face of the apparatus or enclosure. The image of the film disc will be projected through the focusing lens to the mirrors 77 and 76 which will redirect the image to the screen 12 on the face of the enclosure for viewing purposes. The audio transmission on the tape will be synchronized with the slides being viewed so that each audio transmission will be played while the slide is held stationary and viewed on the screen. This is affected by use of the brake which engages the film disc to cause relative sliding movement between the drive roller portion of the capstan and the edge of the film disc preventing rotation of the film disc as the drive capstan rotates the endless tape through the entire audio portion of the message. A synchronizing pulse is included on the opposite half of the tape between each audio message to energize the control network and operate the actuator 46 causing the pin to deflect or pivot the pawl and release the pin from the notch at which point the frictional driving relationship of the drive roller and the capstan and the edge of the disc will cause rotation of the disc advancing the new film slide in alignment with the apertures in the casing. The operation of the actuator is momentary allowing release of the brake by movement of the pin on the pawl out of the notch after which the pawl is released, and the pin will ride on the raised portion of the disc between the notches until the next notch is aligned with the pin. This will bring a new film frame into alignment with the apertures after which the film frame will be held stationary as the audio portion on the tape corresponding thereto is played. In the event of misalignment of the slides on the film disc with the audio message being played, the reset button 30 on the face of the enclosure operates a shunting switch to energize the voltage divider 180 and apply an additional control signal to the control network 80 operating the same independent of the signals on the magnetic tape. Thus, if a particular film in the film disc does not correspond with the audio transmission, the button may be operated to advance the film disc with rotation of the tape until the proper film slide is corresponding with the audio message occurs. This may require manipulation of the button a number of times to advance the disc with rotation of the drive capstan during the playing of an audio message until proper alignment is achieved.

The improved audio visual reproduction apparatus provides for a self-contained and enclosed tape and disc driving arrangement to be driven from a single drive roller in the reproduction apparatus. The dual channel of the magnetic tape with the control signals thereon will be read by dual pickup head bearing against the surface of the tape when the shutter is open. Both the drive roller and the pickup head are spring mounted to provide for movement to insure positive driving and playing relationship with the tape as the film cartridge is inserted into the slot into the apparatus. The structure is simple enabling the use of the same by a child and in a toy type apparatus and merely requires the insertion of a film cartridge and the removal of the same to start and stop the apparatus. The focusing knob merely adjusts the focusing lens in the optical system to insure a sharp picture on the screen and the volume control knob is conventional in the sound reproduction apparatus and is shown only as a knob attached to the amplifier 70. It may be adjusted to raise or lower the level of the audio transmission. The improved film cartridge is completely enclosed at all times except when inserted into the reproduction apparatus at which point the shutter is opened such that the magnetic tape therein is exposed only to the driving and playing elements of the reproduction apparatus to insure tamper-proof operation.

In considering this invention it should be remembered that the present disclosure is illustrative only and the scope of the invention should be determined by the appended claims.

What I claim is:

1. An enclosed tape and film cartridge comprising, a casing having a flexible and movable shutter closing an opening at one end of the casing, means in the casing for opening and closing the shutter, an endless magnetic tape system including a tape spool with tape thereon and with guide members and a drive capstan positioned within the casing with the guide members and the drive capstan directing a loop of the tape from the spool across the opening in one end of said casing, a film disc mounted in the casing and adapted to be rotated such that the film therein will be brought into optical alignment with aligned transparent sections with the casing to permit light to be directed through the casing and through the film in the disc therein, a floating post mounting said film disc, drive roller means positioned on said drive capstan for rotating a disc through a frictional type of drive connection, and selectively operated brake means gripping the film disc and restraining said disc against movement of the frictional drive connection until said brake means is released.

2. The endless tape and film cartridge of claim 1 in which the opening in said casing with operation of the flexible shutter permits a means to be inserted to contact the drive capstan and the tape and to operate the brake means to rotate said endless tape and permit movement of the film disc whenever the brake means is released.

3. The enclosed tape and film cartridge of claim 2 in which the opening in one end of the casing with operation of movable shutter permits the insertion of a sound head to contact the magnetic tape and including means in the cartridge to insure engagement of the tape with the sound head.

4. The enclosed tape and film cartridge of claim 1 in which the brake means includes means for stopping the film disc only when a film therein is in alignment with the transparent sections of the casing.

5. The enclosed tape and film cartridge of claim 4 in which the brake means includes a notched surface on the underside of the film disc and a pivoted pawl member pivotally mounted within the casing and having a pin on one end of the same adapted to rest in the notches of the notched surface to restrict movement of the film disc on its floated mounting post within the casing.

6. The enclosed tape and film cartridge of claim 5 in which the pawl includes a spring biasing the pawl with a pin thereon into engagement of the notched surface on the film disc.

7. The enclosed tape and film cartridge of claim 6 in which the pawl includes a flange adapted to be engaged by a push rod and when pushed to pivot the pawl away from the notched surface on the disc and against the bias of the spring.

8. The enclosed tape and film cartridge of claim 7 in which the pawl with the flange thereon is located adjacent the opening in the end of the cartridge and to one side of the loop of magnetic tape directed across the opening in the cartridge.

9. The enclosed tape and film cartridge of claim 8 in which the casing has the transparent surfaces normal to and adjacent the opening in one end of the cartridge with the surfaces being aligned with the film on the disc to permit the light to be directed through the cartridge in the vicinity of the opening in the end of the same and within the loop of magnetic tape from the tape spool.

10. An audio visual reproduction apparatus comprising an enclosure, a projection device having an optical system for projecting light through a film onto a screen and a sound reproduction system including a pickup head and an amplifying apparatus for reproducing sound for signals on a magnetic tape; said projection device and said sound reproduction system being mounted in said enclosure with said enclosure having a slot in one wall thereof and with power means connected thereto to power the apparatus; an enclosed tape and film cartridge adapted to be selectively positioned into the slot in the enclosure, said tape and film cartridge including a casing having a flexible shutter closing an opening in one end thereof; an endless magnetic tape system including a tape spool and tape thereon and with guide members and a drive capstan positioned within the casing with the guide members and a drive capstan directing a loop from the tape from the endless spool across the opening appearing in one end of said casing; a film disc mounted in the casing and adapted to be rotated such that the film therein will be brought into optical alignment with aligned transparent sections of the cartridge to permit light from the optical system to be directed through the casing and through the film in the disc projecting the film onto the screen; a floating post mounting said film disc, drive roller means positioned on said drive capstan for rotating the disc through a frictional type of connection; selectively operable brake means gripping the film disc and restraining said disc against movement of the frictional drive connection until said brake means is released; power drive means positioned in the enclosure and contacting the capstan with the tape therebetween to rotate the capstan and drive the tape when said shutter means is open; control circuit means positioned in the enclosure for energizing said projection device, said sound reproduction system, said power drive means and the brake means with insertion of the cartridge into said slot; and means in the enclosure for opening the shutter to expose the tape and the drive capstan with insertion of the cartridge into the slot; and means in the enclosure for opening the shutter to expose the tape and the drive capstan with insertion of the cartridge into the slot.

11. The audio visual reproduction apparatus of claim 10 in which the control circuit means includes a control circuit to a second portion of the pickup head to receive control signals from the magnetic tape and including an actuator operated to release the brake means with the presence of a control signal.

12. The audio visual reproduction apparatus of claim 11 in which the actuator in the enclosure includes a pin projecting into the tape and film cartridge to engage and release the brake means with operation of the actuator.

13. The audio visual reproduction apparatus of claim 12 in which the pickup head, drive roller and brake pin is positioned within the enclosure to project into the tape and film cartridge through the opening therein when the shutter of the cartridge is open.

14. The audio visual reproduction apparatus of claim 11 in which the brake means includes means for stopping the film disc only when a film therein is in alignment with transparent sections of the casing.

15. The audio visual reproduction apparatus of claim 14 in which the brake means includes a notched surface on one side of the film disc and a pivoted pawl member pivotally mounted within the casing and having a pin at one end of the same adapted to rest in the notched surfaces of the film disc to restrict movement thereof on its mounting means.

16. The audio visual reproduction apparatus of claim 15 in which the actuator in the enclosure includes a pin adapted to project into the opening in the casing of the film cartridge and in which the brake means includes a flange adapted to be contacted by the pin to pivot the pawl member and release the brake means with operation of the actuator.

17. The audio visual reproduction apparatus of claim 10 in which the magnetic tape has a dual channel of signals thereon and the pickup head includes two receiving portions, one of which is connected to the sound reproduction system and the other to the control circuit means for operating said brake means.

18. The audio visual reproduction apparatus of claim 17 and including contact means on the face of the enclosure for operating the actuator to release the brake means independent of signals on the dual channel tape as received by the sound pickup means.

19. The audio visual reproduction apparatus of claim 18 in which the contact means on the face of the enclosure is a shunting switch connected to a control circuit to supply an independent signal to control circuit means.

20. The audio visual reproduction apparatus of claim 10 in which the means within the enclosure for operating the shutter is an actuator pin operatively engaging the tape and film cartridge to open the shutter as the cartridge is inserted into the slot in the enclosure.

21. An enclosed tape and film cartridge comprising, a casing having an opening in one end thereof and a closure means for opening and closing said opening; a magnetic tape system including at least one tape spool with magnetic tape thereon with guide members and a drive capstan positioned within the casing and with the guide members and the drive capstan directing a loop of the magnetic tape from the spool across the opening in said one end of the casing, a film disc mounted in the casing and adapted to be rotated such that film therein would be brought into optical alignment with transparent sections in the casing to permit light to be directed through the casing and on to the film in the disc, a drive roller coupled with the drive capstan for rotating said disc, means mounting said disc within the casing and in cooperative relationship with the drive roller to provide a frictional type of drive connection, and selectively operable brake means gripping the film disc and restraining the disc against movement of the frictional drive connection from the drive roller until the brake means is released.

* * * * *